United States Patent
Jung et al.

(10) Patent No.: US 8,654,385 B2
(45) Date of Patent: Feb. 18, 2014

(54) SYSTEM AND METHOD FOR DYNAMIC DEPLOYMENT OF CLOUD-BASED PRINTING SERVICES

(75) Inventors: Gueyoung Jung, Rochester, NY (US); Lee Coy Moore, Penfield, NY (US); Barry Glynn Gombert, Rochester, NY (US); Jean Pierre Van de Capelle, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 66 days.

(21) Appl. No.: 13/419,240

(22) Filed: Mar. 13, 2012

(65) Prior Publication Data
US 2013/0242339 A1    Sep. 19, 2013

(51) Int. Cl.
    *G06F 3/12* (2006.01)
(52) U.S. Cl.
    USPC .......................................................... 358/1.15
(58) Field of Classification Search
    USPC .......................................................... 358/1.15
    See application file for complete search history.

(56) References Cited

U.S. PATENT DOCUMENTS

8,463,633 B2    6/2013   Jung et al.

*Primary Examiner* — Eric A Rust
(74) *Attorney, Agent, or Firm* — Fox Rothschild LLP (57) ABSTRACT

A method of scheduling a print job may include determining a first set of deployments that includes one or more deployments. Each deployment in the first set may include an indication of a logical device in a cloud environment and an indication of a production center. The method may include for one or more deployments in the first set of deployments, determining a total compliance value associated with the deployment, identifying a subset of deployments based on, at least in part, the associated total compliance values, generating a new set of deployments based on, at least in part, the identified subset of deployments, and in response to the first set of deployments being an improvement over the new set of deployments, incrementing a count variable, and repeating the determining a total compliance value, identifying, and generating operations until the count variable equals an exit condition value.

20 Claims, 5 Drawing Sheets

SYSTEM AND METHOD FOR DYNAMIC DEPLOYMENT OF CLOUD-BASED PRINTING SERVICES

BACKGROUND

Cloud-based systems, such as those that provide print production services, are often geographically distributed, and the distribution and amount of traffic between consumers and cloud-based systems usually change dynamically over time. However, most cloud systems do not consider consumer location or cloud-based system location in scheduling the performance of cloud-based services. As such, transfer and other delays may exist which impact the efficiency with which services are provided.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of scheduling a print job may include determining a first set of deployments that includes one or more deployments. Each deployment in the first set may include an indication of a logical device in a cloud environment and an indication of a production center. The method may include for one or more deployments in the first set of deployments, determining a total compliance value associated with the deployment, identifying a subset of deployments based on, at least in part, the associated total compliance values, generating a new set of deployments based on, at least in part, the identified subset of deployments, and in response to the first set of deployments being an improvement over the new set of deployments, incrementing a count variable, and repeating the determining a total compliance value, identifying, and generating operations until the count variable equals an exit condition value.

In an embodiment, a method of scheduling a print job may include determining a first set of deployments. The first set may include one or more deployments, and each deployment in the first set may include an indication of a logical device in a cloud environment and an indication of a production center. The method may include, for one or more deployments in the first set of deployments, determining a total compliance value associated with the deployment, identifying a subset of deployments based on, at least in part, the associated total compliance values, generating a new set of deployments based on, at least in part, the identified subset of deployments, and in response to the new set of deployments being an improvement over the first set of deployments, assigning one or more print jobs to one or more of the deployments in the new set of deployments for processing.

In an embodiment, a system for scheduling a print job may include a computing device and a computer-readable storage medium in communication with the computing device. The computer-readable storage medium may include one or more programming instructions that, when executed, cause the computing device to determine a first set of deployments that includes one or more deployments, where each deployment in the first set includes an indication of a logical device in a cloud environment and an indication of a production center. The computer-readable storage medium may include one or more programming instructions that, when executed, cause the computing device to, for one or more deployments in the first set of deployments, determine a total compliance value associated with the deployment, identify a subset of deployments based on, at least in part, the associated total compliance values, generate a new set of deployments based on, at least in part, the identified subset of deployments, and in response to the new set of deployments being an improvement over the first set of deployments, increment a count variable, and repeat the determining a total compliance value, identifying, and generating operations until the count variable equals an exit condition value.

BRIEF DESCRIPTION OF THE DRAWINGS

Aspects, features, benefits and advantages of the present invention will be apparent with regard to the following description and accompanying drawings, of which.

DETAILED DESCRIPTION

The following terms shall have, for purposes of this application, the respective meanings set forth below:

A "cloud environment" refers to one or more physical and/or logical devices that operate as a shared resource for multiple consumer computing devices, production centers, print devices and/or other computing devices. Logical devices in a cloud administration system may be accessed without any knowledge of the corresponding physical devices.

A "deployment" refers to a logical device and a production center to which a job may be transmitted. For example, if a job is processed by Logical Device 1 and Production Center A, a deployment may be {Logical Device 1, Production Center A}.

An "end-to-end delay" refers to an amount of time that a job is or may be delayed from submission of the job until completion of the job. An end-to-end delay may include data transfer delays, computational delays, transfer delays, production delays, processing delays and/or other delays.

A "job" refers to a logical unit of work that is to be completed for a customer. In a print environment, a job may include one or more print jobs from one or more clients.

A "logical device" is a representation of a physical device that uniquely identifies the corresponding physical device. For example, a logical device may be a software implementation of a physical device that executes programs or applications similar to a physical device.

An "operation" refers to any operation, function or action that is performable by a computing device.

A "physical device" is a physical resource such as a computing device, a computer-readable storage medium and/or the like.

A "prepress operation" refers to a preparatory service that is performed on a job before the job reaches a production stage. Example prepress operations in a print production environment may include, without limitation, converting a print job from a first page description language ("PDL") to a second PDL, performing color management operations, preflighting to identify potential print incompatibilities, performing imposition, VI composition, rotation, automated image enhancement, level shifting, mirroring, cropping and/or resizing in a print job or a portion of a print job, joining print jobs, adding one or more pressmarks, such as color bars, and/or adding one or more of a page number, a Bates stamp, text, an image watermark and a barcode.

A "print job" refers to a job processed in a print production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "print shop" refers to an entity that includes a plurality of print devices, such as printers, cutters, collators and the like. A print shop may be a freestanding entity, including one or more print devices, or it may be part of a corporation or other entity. Additionally, a print shop may communicate with one or more servers by way of a communications network, such as the Internet, an intranet, a LAN, a WAN, a wireless network and/or the like.

A "turnaround time" refers to a time difference between a time a job is submitted and a time the job is due to be completed. Turnaround time may include pre-processing time such as the amount of setup time required for one or more print devices, value added time and waiting time due to machine and/or operator unavailability.

Figure 1:
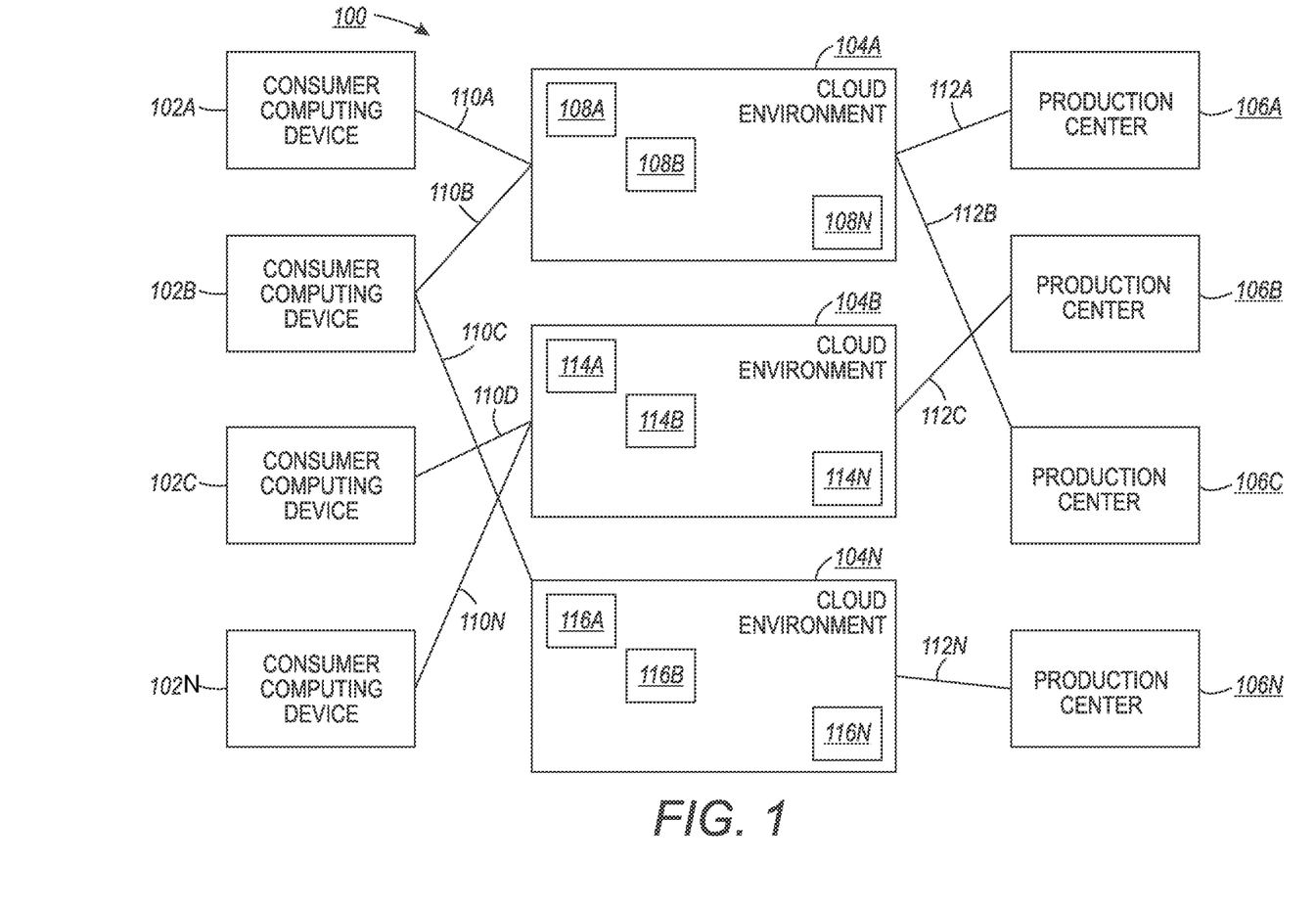
FIG. 1 shows a block diagram of an illustrative production system according to an embodiment.

FIG. 1 shows a block diagram of an illustrative production system according to an embodiment. As illustrated by FIG. 1, a production system 100 may include one or more consumer computing devices 102a-N, one or more cloud environments 104a-N and one or more production centers 106a-N.

A consumer computing device 102a-N may be a computing device configured to transmit one or more jobs to one or more cloud environments 104a-N. In an embodiment, a consumer computing device 102a-N may be in communication with one or more cloud environments 104a-N via one or more networks 110a-N. In an embodiment, a network 110a-N may be the Internet. In an alternate embodiment, other networks, such as an intranet, WAN or LAN may be used.

In an embodiment, a cloud environment 104a-N may include one or more logical devices 108a-N, 114a-N, 116a-N. The logical devices 108a-N, 114a-N, 116a-N may each be associated with a particular entity, such as a cloud service provider. In an embodiment, the logical devices 108a-N, 114a-N, 116a-N may be associated with a cloud-based service which may be performed on one or more jobs. For example, in a print production system, a cloud environment 104a-N may include one or more logical devices 108a-N, 114a-N, 116a-N each capable of performing one or more prepress operations on one or more jobs. In an embodiment, multiple jobs may share a set of cloud-based service instances over a certain period of time. Each cloud-based service may run in parallel on multiple logical devices, each of which may host a service instance.

In an embodiment, a cloud environment 104a-N may be in communication with one or more production centers 106a-N via one or more networks 112a-N. In an embodiment, a network 112a-N may be the Internet. In an alternate embodiment, other networks, such as an intranet, WAN or LAN may be used. For example, in a print production system, a cloud environment 104a-N may be in communication with one or more print shops via a network 112a-N. One or more of the production centers 106a-N may be located remotely from the cloud environment 104a-N. In an embodiment, one or more of the production centers 106a-N may be located remotely from one another. For example, one production center 106a may be located in New York, while another production center 106b may be located in Florida.

Figure 2:
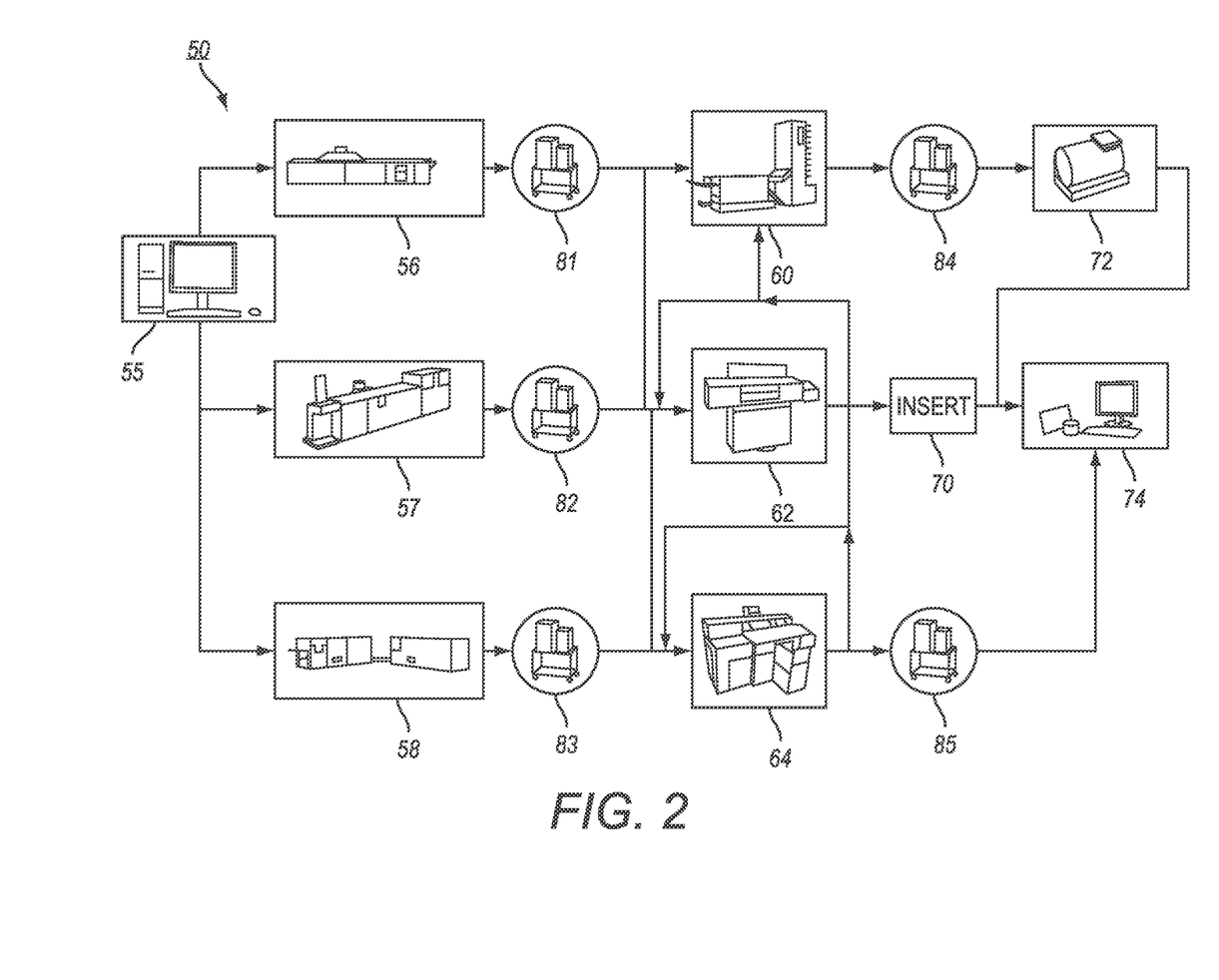
FIG. 2 shows a block diagram of an illustrative production center according to an embodiment.

FIG. 2 shows an example of a production center 50, in this case, examples of elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85. Although the disclosed embodiments pertain to document production systems, the disclosed methods and systems can be applied to production systems in general.

By using cloud environments and cloud-based services, businesses may access optimized service workflows with benefits such as managed service upgrades, reduced capital expenditures and usage-based pricing models. Typically, cloud-based services are deployed on logical devices. Service providers may provide better service quality by assigning jobs to logical devices with various methodologies, such as intelligent logical device placement on physical devices, increasing and/or decreasing the number of logical device instances and/or load-balancing between logical devices.

In an embodiment, each job that is submitted to a cloud environment for processing may have an associated turnaround time. A turnaround time may be a time period between the time a job is submitted and the time the job is due to be completed. In an embodiment, a turnaround time may be specified by a service level agreement (SLA) or other agreement between a consumer and a service provider that governs the processing of the job. In an embodiment, a turnaround time may be specific to a consumer. For example, an SLA may specify that all jobs submitted by a certain consumer are to be completed within 24 hours. If a job is not processed within a turnaround time, penalties, such as financial penalties, may be incurred by a service provider. In an embodiment, a turnaround time may be specified by a consumer, a service provider and/or the like.

In an embodiment, because consumer computing devices, cloud environments and production centers may be distributed, production delays, such as data transfer delays, may be incurred by a production system. For example, a data transfer delay may occur when a job is transmitted by a consumer computing device to a cloud environment. As another example, a data transfer delay may occur when a job or a portion of a job is transmitted from a cloud environment to a production center. Data transfer delays may vary based on, for example and without limitation, traffic load or a geographical distribution of requests, both of which may vary over time. Data transfer delays may affect the processing time of a job and may cause the processing time to exceed the turnaround time.

In an embodiment, data transfer delays may be reduced by assigning jobs to logical devices that are located closest to the greatest number of consumer computing devices and production centers as possible. However, when a large number of jobs are sent to the geographically closest logical devices, the computational delays and overall processing time may significantly increase due to overload.

Figure 3:
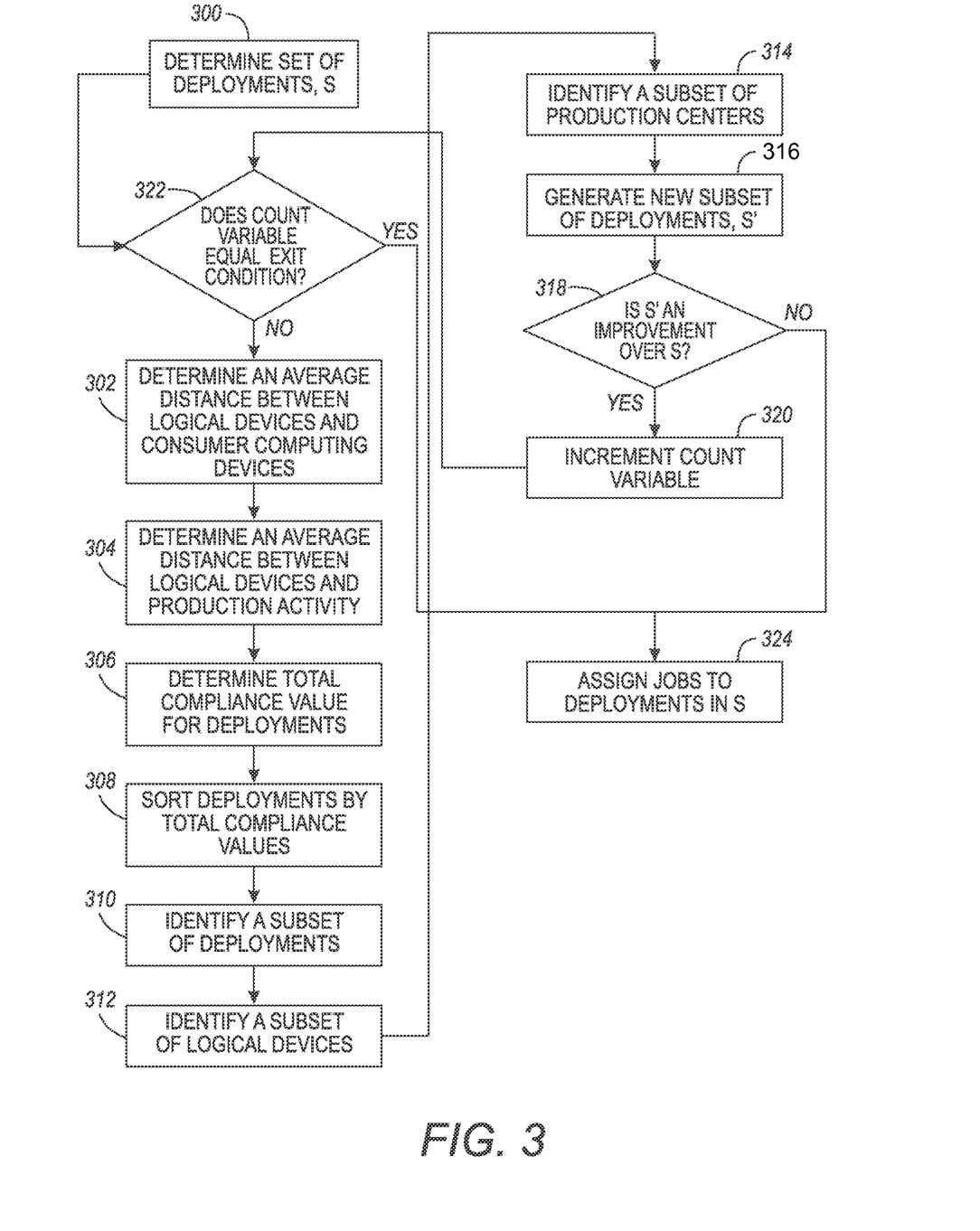
FIG. 3 illustrates a flow diagram of a method of scheduling print jobs in a production system according to an embodiment.

FIG. 3 illustrates a block diagram of a method of scheduling print jobs in a production system according to an embodiment. Deployment of jobs may be considered as a k-median problem, meaning that k logical devices are found out of all possible logical devices such that the found logical devices maximize the number of jobs that are processed within their associated turnaround time by reducing the sum of the distances between the k logical devices, n consumer computing devices and k' production centers.

In an embodiment, a production system may include multiple logical devices and/or production centers. As such, a job may be assigned to a number of different combinations of logical devices and production centers. Each combination may be referred to as a deployment.

As illustrated by FIG. 3, a set of deployments may be determined 300. A set of deployments may be represented by S. In an embodiment, a deployment may be a pair of logical devices and production centers to which a job may be transmitted. Table 1 illustrates example deployments based on the system illustrated by FIG. 4. As illustrated by Table 1, a deployment may be {D, G}.

TABLE 1

| Logical Device | Production Center |
| --- | --- |
| D | G |
| D | H |
| D | I |
| E | G |
| E | H |
| E | I |
| F | G |
| F | H |
| F | I |

In an embodiment, a set of initial deployments may include all possible deployments, as illustrated in Table 1. In an alternate embodiment, a set of initial deployments may include a subset of all possible deployments, such as those illustrated in Table 2.

TABLE 2

| Logical Device | Production Center |
| --- | --- |
| D | G |
| E | G |

TABLE 2-continued

| Logical Device | Production Center |
| --- | --- |
| D | I |
| E | H |
| F | H |

In an embodiment, an average distance between one or more logical devices in a set of deployments, S, and one or more consumer computing devices may be determined 302. As used herein, the term "average" shall be construed broadly to cover any operation in which multiple data inputs affect a single data output. Further, data inputs and/or outputs need not be numerically precise. For example, suitable inputs or outputs may be simply 'close' and 'far.'

A distance may correspond to a physical distance between devices. Alternatively, a distance may be a logical distance such as turnaround time and/or the like. In an embodiment, a location of one or more consumer computing devices and/or one or more logical devices may be stored in a database or other computer-readable storage medium. A distance between a consumer computing device and a logical device may be determined based on the location information. Alternatively, a database or other computer-readable storage medium may store one or more distances between one or more consumer computing devices and/or one or more logical devices. Table 3 illustrates distances, in miles, between the consumer computing devices identified in FIG. 4 and the logical devices identified in Table 2 according to an embodiment.

TABLE 3

| Consumer Computing Device | Logical Device | Distance (miles) |
| --- | --- | --- |
| A | D | 50 |
| A | E | 100 |
| A | F | 75 |
| B | D | 230 |
| B | E | 205 |
| B | F | 125 |
| C | D | 350 |
| C | E | 345 |
| C | F | 290 |

In an embodiment, an average distance from a consumer computing device to a logical device may be determined 302 by summing the distances between one or more consumer computing devices and a logical device and dividing the sum by the total number of consumer computing devices. For example, referring to Table 2, the average distance between consumer computing devices A, B and C and logical device D may be represented by:

$$\frac{50 + 230 + 350}{3} = 210 \text{ miles.}$$

Table 4 illustrates average distances between consumer computing devices and the logical devices illustrated in Table 2 according to an embodiment.

TABLE 4

| Logical Device | Average Distance between Logical Device and Consumer Computing Devices (miles) |
|---|---|
| D | 210 |
| E | 216.66 |
| F | 163.33 |

In an embodiment, an average distance between one or more logical devices in an initial set of deployments, S, and one or more production centers in S may be determined 304. In an embodiment, a location of one or more logical devices and/or one or more production centers may be stored in a database or other computer-readable storage medium. A distance between a logical device and a production center may be determined based on the location information. Alternatively, a database or other computer-readable storage medium may store one or more distances between one or more logical devices and/or one or more production centers. Table 5 illustrates distances, in miles, between the logical devices and production centers identified in FIG. 4 according to an embodiment.

TABLE 5

| Logical Device | Production Center | Distance (miles) |
|---|---|---|
| D | G | 120 |
| D | H | 120 |
| D | I | 75 |
| E | G | 60 |
| E | H | 30 |
| E | I | 45 |
| F | G | 100 |
| F | H | 80 |
| F | I | 20 |

In an embodiment, an average distance between a logical device and a production center may be determined 304 by summing the distances between one or more logical devices and production centers and dividing the sum by the total number of logical devices. For example, referring to Table 4, the average distance between logical devices D, E and F and production center G may be represented by:

$$\frac{120 + 60 + 100}{3} = 93.33 \text{ miles.}$$

Table 6 illustrates average distances between logical devices and the production centers illustrated in Table 2 according to an embodiment.

TABLE 6

| Production Center | Average Distance between Logical Device and Production Center (miles) |
|---|---|
| G | 93.33 |
| H | 76.66 |
| I | 46.66 |

In an embodiment, a compliance value may be determined 306 for one or more deployments. A compliance value may represent whether a delay associated with a particular deployment is less than, equal to or greater than a turnaround time, TT, associated with a consumer, u.

In an embodiment, a compliance value may be represented by I(u). I(u) may be equal to 1 if $D_t(u) \leq TT(u)$. I(u) may be equal to 0 if $D_t(u) > TT(u)$.

In an embodiment, an overall end-to-end delay, $D_t(u)$, for a single consumer, u, at the current time period, t, may be represented by the following:

$$D_t(u) = D(u, N'_t) + C(N'_t) + D(N'_t, P'hd\ t) + C(P'_t),\ \text{where:}$$

$D(u, N'_t)$ is the data transfer delay between the consumer computing device and k logical devices, $C(N'_t)$ is the computational delay of k logical devices, $D(N'_t, P'_t)$ is the transfer delay between k logical devices and k' production centers, $C(P'_t)$ is the production delay at k' production centers, $N'_t$ is a sub-set of computing nodes of size k, where k represents the number of logical devices, and $P'_t$ is a sub-set of production centers of size k', where k' represents the number of production centers.

In an embodiment, the overall end-to-end delay may represent the overall distance from a consumer computing device to one or more logical devices and from the one or more logical devices to one or more production centers.

In an embodiment, the data transfer delay, the computational delay and/or the production delay may be estimated. The data transfer delay, the computational delay and/or the production delay may be estimated based on historical delay information from prior time periods for the same consumer.

In an embodiment, a transfer delay, a computational delay and/or a production delay for a new consumer may be estimated by associating the new consumer with one or more similar existing consumers. In an embodiment, similarity may be based on a location of an existing consumer and a new consumer. For example, a new consumer may be determined to be similar to an existing consumer if the new consumer and the existing consumer are associated with locations that are relatively close to one another. As such, a transfer delay, a computational delay and/or a production delay for a similar existing consumer may be used to estimate a transfer delay, a computational delay and/or a production delay for the new consumer.

Figure 4:
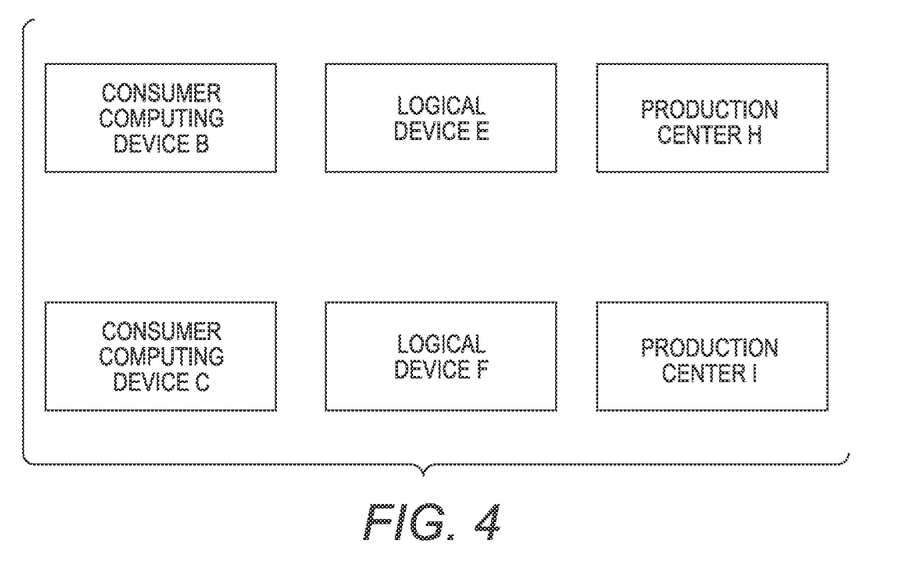
FIG. 4 shows a block diagram of an illustrative production system according to an embodiment.

Table 7 illustrates example delay times, turnaround times and compliance values associated with the deployments illustrated in FIG. 4 for each consumer according to an embodiment.

TABLE 7

| Consumer | Deployment | $D(u, N'_t)$ (seconds) | $C(N'_t)$ (seconds) | $D(N'_t, P'_t)$ (seconds) | $C(P'_t)$ (seconds) | $D_t(u)$ (seconds) | TT(u) (seconds) | I(u) |
|---|---|---|---|---|---|---|---|---|
| A | {D, G} | 1.2 | 15 | 2.8 | 2,000 | 2,019 | 7,200 | 1 |
|   | {E, G} | 0.7 | 8.5 | 3.1 | 1,000 | 1,012.3 | 900 | 0 |
|   | {D, I} | 1.4 | 70 | 12 | 3,400 | 3,423.4 | 2,700 | 0 |
| B | {D, G} | 0.8 | 45 | 1.6 | 5,000 | 5,047.4 | 6,000 | 1 |
|   | {E, G} | 0.32 | 13.9 | 9.8 | 750 | 774.02 | 1,800 | 1 |
|   | {D, I} | 3.1 | 100 | 13.1 | 3,000 | 3,116.2 | 2,700 | 0 |

TABLE 7-continued

| Consumer | Deployment | D(u, N'$_t$) (seconds) | C(N'$_t$) (seconds) | D(N'$_t$P'$_t$) (seconds) | C(P'$_t$) (seconds) | D$_t$(u) (seconds) | TT(u) (seconds) | I(u) |
|---|---|---|---|---|---|---|---|---|
| C | {D, G} | 10 | 15 | 20 | 1,000 | 1,045 | 3,600 | 1 |
|   | {E, G} | 12.0 | 11.5 | 2.3 | 200 | 225.8 | 600 | 1 |
|   | {D, I} | 5.0 | 6.0 | 1.0 | 2,000 | 2,012 | 1,800 | 0 |

TABLE 8

| Deployment | I(A) | I(B) | I(C) | Total Compliance Value |
|---|---|---|---|---|
| {D, G} | 1 | 1 | 1 | 3 |
| {E, G} | 0 | 1 | 1 | 2 |
| {D, I} | 0 | 0 | 0 | 0 |

In an embodiment, a total compliance value may be determined for one or more deployments. Table 8 illustrates examples of total compliance values according to an embodiment. A total compliance value may be the sum of the compliance values associated with each consumer of the deployment. For example, as illustrated by Table 8, the total compliance value for deployment {D, G} may be the sum of the compliance values associated with deployment {D, G} and consumers A, B and C (i.e., 1+1+1=3).

In an embodiment, the deployments may be sorted 308 by their associated total compliance value. Deployments may be sorted 308 from highest to lowest total compliance value, from lowest to highest compliance value or by another method. Table 8 illustrates deployments sorted from highest to lowest total compliance value.

In an embodiment, a subset of deployments may be identified 310 based, at least in part, on the identified subset of deployments. A subset of deployments may include one or more deployments associated with a total compliance value that equal or exceed a threshold value. For example, a subset of deployments may include one or more deployments associated with a total compliance value that equals or exceeds '3.' Additional and/or alternate threshold values may be used within the scope of this disclosure.

In an embodiment, a subset of deployments may include a certain percentage of deployments. For example, a subset of deployments may include deployments associated with the top ten percent of total compliance values. Additional and/or alternate percentages may be used within the scope of this disclosure.

In an embodiment, a subset of logical devices may be identified 312 based, at least in part, on the identified subset of deployments. A subset of logical devices may include one or more logical devices that are associated with the identified subset of deployments. For example, referring to Table 8, if a subset of deployments includes {D,G} and {E,G}, then an identified subset of logical devices may include D and E.

In an embodiment, a subset of production centers may be identified 314 based, at least in part, on the identified subset of deployments. A subset of production centers may include one or more production centers that are associated with the identified subset of deployments. For example, referring to Table 8, if a subset of deployments includes {D,G} and {E,G}, then an identified subset of production centers may include G.

In an embodiment, a new set of deployments, S', may be generated 316. In an embodiment, a best deployment may be identified from the identified subset of deployments. A best deployment may be a deployment associated with a highest total compliance value. For example, referring to Table 8, deployment {D,G} may be identified as the best deployment. In an embodiment, the identified best deployment may be added to S'. Adding an identified best deployment to S' may be referred to as elitism.

In an embodiment, one or more logical devices in S may be replaced in S' by one or more logical devices in the identified subset of logical devices. The logical devices that are to be replaced may be determined based on the average distance between the logical device and consumer computing devices as determined 302 above.

In an embodiment, one or more production centers in S may be replaced in S' by one or more production centers in the identified subset of production centers. The production centers that are to be replaced may be determined based on the average distance between the production center and the logical devices as determined 304 above. For example, referring to FIG. 4, if {E, G} is a deployment in S, and Logical Device D is determined to be better logical device than Logical Device E, then Logical Device E may be replaced with Logical Device D in the deployment, and deployment {D, G} may be added to S'.

In an embodiment, it may be determined 318 whether S' is an improvement over S. S' may be an improvement over S based on one or more compliance values of one or more deployments in S' and one or more deployments in S. One or more deployments in S' may be selected, and one or more deployments in S may be selected. In an embodiment, the deployments selected from S and/or S' may be deployments associated with one or more top-rated compliance values. For example, the two deployments associated with the highest compliance values may be selected from both S and S'. Additional and/or alternate selections may be used within the scope of this disclosure.

Table 9 illustrates example top-rated deployments and compliance values from an example S and S' according to an embodiment.

TABLE 9

| Set | Deployment | Compliance Value |
|---|---|---|
| S | Deployment 1 | 3 |
| S | Deployment 2 | 2 |
| S' | Deployment 1 | 2 |
| S' | Deployment 2 | 1 |

In an embodiment, an average compliance value may be determined for the selected deployments from each of S and S'. For example, referring to Table 9, an average compliance value may be determined for the deployments from S, and an average compliance value may be determined for the deployments from S'. The average compliance value for the deployments from S may be 2.5

$$\left(\text{i.e., } \frac{3+2}{2}\right)$$

and the average compliance for the deployments from S' may be 1.5

$$\left(\text{i.e., } \frac{1+2}{2}\right).$$

In an embodiment, S' may be an improvement over S if the average compliance value associated with S' is greater than the average compliance value associated with S.

If S' is improved over S, a count variable that is initially equal to zero may be incremented 320. As shown by FIG. 3, certain operations may be repeated (e.g., 302-318) until the count variable meets 322 an exit condition variable. The value of an exit condition variable may be based on an amount of time during which the operations may be repeated and/or the amount of time each iteration takes. For example, operations may be repeated for a maximum of three minutes. If each iteration takes ten seconds, the exit condition variable may be equal to eighteen.

In an embodiment, if S' is not an improvement over S or if the count variable meets the exit condition variable, one or more jobs may be assigned 324 to the deployment in S associated with the highest compliance value may be assigned to be processed.

Figure 5:
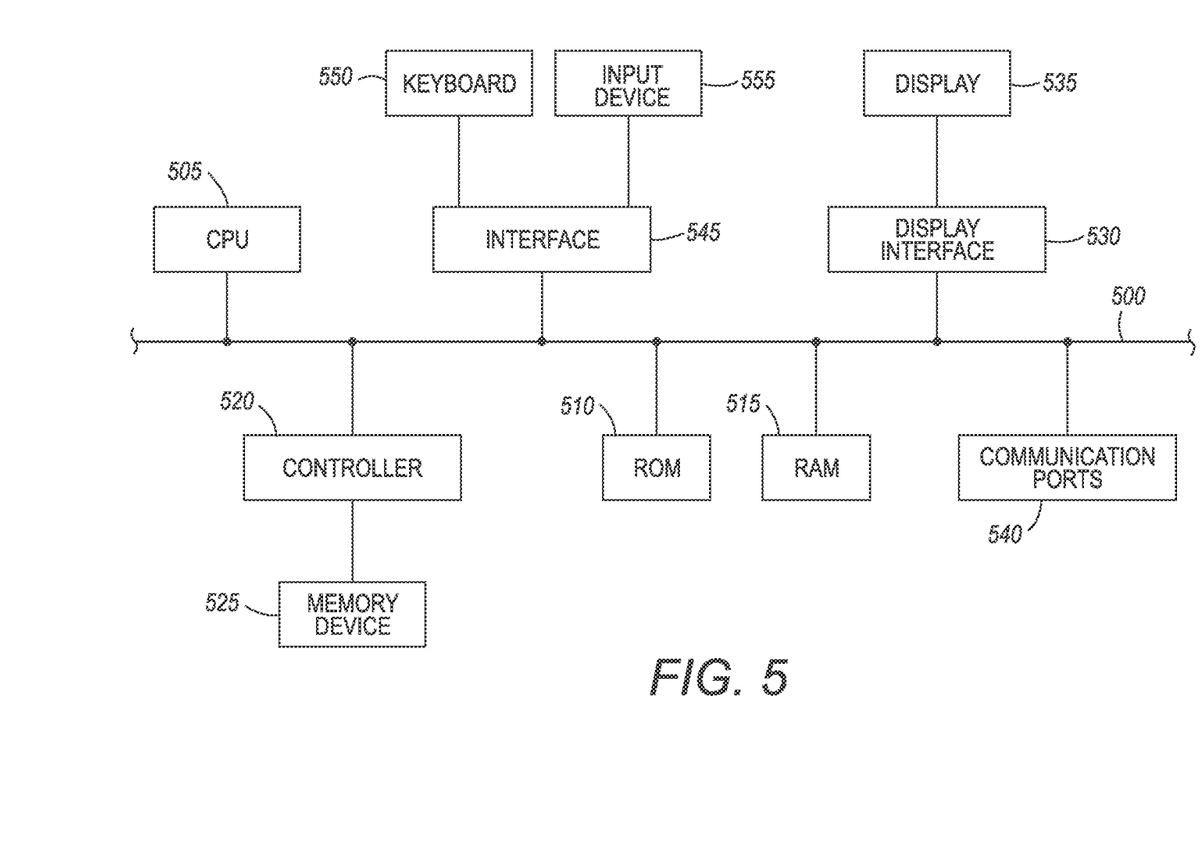
FIG. 5 illustrates a block diagram of hardware that may be used to contain or implement program instructions according to an embodiment.

FIG. 5 depicts a block diagram of hardware that may be used to contain or implement program instructions according to an embodiment. A bus 500 serves as the main information highway interconnecting the other illustrated components of the hardware. CPU 505 is the central processing unit of the system, performing calculations and logic operations required to execute a program. Read only memory (ROM) 510 and random access memory (RAM) 515 constitute examples of memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions may be stored in the ROM 510 and/or the RAM 515. Optionally, program instructions may be stored on a tangible computer readable storage medium such as a hard disk, compact disk, a digital disk, flash memory, a memory card, a USB drive, an optical disc storage medium, such as Blu-Ray™ disc, and/or other recording medium.

An optional display interface 530 may permit information from the bus 500 to be displayed on the display 535 in audio, visual, graphic or alphanumeric format. Communication with external devices may occur using various communication ports 540. A communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of scheduling a print job, the method comprising:
   determining a first set of deployments comprising one or more deployments, wherein each deployment in the first set comprises an indication of a logical device in a cloud environment and an indication of a production center;
   for one or more deployments in the first set of deployments, determining a total compliance value associated with the deployment by:
      for one or more consumers:
         determining a turnaround time associated with the consumer,
         determining an end-to-end delay associated with the consumer and the deployment, and
         determining a compliance value for the consumer based on the turnaround time and the end-to-end delay, and
      summing compliance values for the one or more consumers;
   identifying a subset of deployments based on, at least in part, one or more associated total compliance values;
   generating a new set of deployments based on, at least in part, the identified subset of deployments; and
   in response to the first set of deployments being an improvement over the new set of deployments:
      incrementing a count variable, and
      repeating the determining a total compliance value, identifying, and
   generating operations until the count variable equals an exit condition value.

2. The method of claim 1, wherein determining a turnaround time associated with the consumer comprises identifying the turnaround time from a service level agreement associated with the consumer.

3. The method of claim 1, wherein determining an end-to-end delay comprises:
   determining a data transfer delay between the consumer and the logical device associated with the deployment;
   determining a computational delay associated with the logical device;
   determining a transfer delay between the logical device and the production center of the deployment;
   determining a production delay associated with the production center of the deployment; and
   summing the data transfer delay, the computational delay, the transfer delay and the production delay.

4. The method of claim 1, wherein determining a compliance value comprises, in response to the turnaround time exceeding the end-to-end delay, assigning the compliance value a value.

5. The method of claim 1, wherein determining a compliance value comprises, in response to the turnaround time not exceeding the end-to-end delay, assigning the compliance value a value.

6. The method of claim 1, wherein identifying a subset of deployments comprises identifying one or more deployments having total compliance values that each exceed a threshold value.

7. The method of claim 1, wherein identifying a subset of deployments comprises identifying one or more deployments associated with a percentage of total compliance values.

8. The method of claim 1, wherein identifying a subset of deployments comprises identifying one or more deployments based on, at least in part, an average distance between the logical device of the deployment and one or more consumer computing devices.

9. The method of claim 1, wherein identifying a subset of deployments comprises identifying one or more deployments based on, at least in part, an average distance between the logical device of the deployment and one or more production centers.

10. The method of claim 1, wherein generating a new set of deployments comprises:
   identifying a best deployment from the first set of deployments; and
   adding the best deployment to the new set of deployments.

11. The method of claim 1, wherein generating a new set of deployments comprises:
   replacing, one or more logical devices in the first set of deployments with one or more logical devices based on an average distance between one or more consumers and the logical device.

12. The method of claim 1, wherein generating a new set of deployments comprises:
   replacing, one or more production centers in set of deployments with one or more production centers based on an average distance between one or more logical devices and the one or more production centers.

13. A method of scheduling a print job, the method comprising:
   determining a first set of deployments, wherein the first set comprises one or more deployments, wherein each deployment in the first set comprises an indication of a logical device in a cloud environment and an indication of a production center;
   for one or more deployments in the first set of deployments, determining a total compliance value associated with the deployment by:
      for one or more consumers:
         determining a turnaround time associated with the consumer,
         determining an end-to-end delay associated with the consumer and the deployment, and
         determining a compliance value for the consumer based on the turnaround time and the end-to-end delay, and
      summing compliance values for the one or more consumers;
   identifying a subset of deployments based on, at least in part, one or more associated total compliance values;
   generating a new set of deployments based on, at least in part, the identified subset of deployments; and
   in response to the new set of deployments being an improvement over the first set of deployments, assigning one or more print jobs to one or more of the deployments in the new set of deployments for processing.

14. A system for scheduling a print job, the system comprising:
   a computing device; and
   a computer-readable storage medium in communication with the computing device, wherein the computer-readable storage medium comprises one or more programming instructions that, when executed, cause the computing device to:
      determine a first set of deployments comprising one or more deployments, wherein each deployment in the first set comprises an indication of a logical device in a cloud environment and an indication of a production center,
      for one or more deployments in the first set of deployments, determine a total compliance value associated with the deployment by:
         for one or more consumers:
            determining a turnaround time associated with the consumer,
            determining an end-to-end delay associated with the consumer and the deployment, and
            determining a compliance value for the consumer based on the turnaround time and the end-to-end delay, and
         summing compliance values for the one or more consumers,
      identify a subset of deployments based on, at least in part, one or more associated total compliance values,
      generate a new set of deployments based on, at least in part, the identified subset of deployments, and
      in response to the new set of deployments being an improvement over the first set of deployments:
         increment a count variable, and
         repeat the determining a total compliance value, identifying, and generating operations until the count variable equals an exit condition value.

15. The system of claim 14, wherein the one or more programming instructions that, when executed, cause the computing device to determine an end-to-end delay comprise one or more programming instructions that, when executed, cause the computing device to:
   determine a data transfer delay between the consumer and the logical device associated with the deployment;
   determine a computational delay associated with the logical device;
   determine a transfer delay between the logical device and the production center of the deployment;
   determine a production delay associated with the production center of the deployment; and
   sum the data transfer delay, the computational delay, the transfer delay and the production delay.

16. The system of claim 14, wherein the one or more programming instructions that, when executed, cause the computing device to identify a subset of deployments comprise one or more programming instructions that, when executed, cause the computing device to identify one or more deployments having total compliance values that each exceed a threshold value.

17. The system of claim 14, wherein the one or more programming instructions that, when executed, cause the computing device to identify a subset of deployments comprise one or more programming instructions that, when executed, cause the computing device to identify one or more deployments associated with a percentage of total compliance values.

18. The system of claim 14, wherein the one or more programming instructions that, when executed, cause the computing device to identify a subset of deployments comprise one or more programming instructions that, when executed, cause the computing device to identify one or more deployments based on, at least in part, one or more of the following:
   an average distance between the logical device of the deployment and one or more consumer computing devices; and
   an average distance between the logical device of the deployment and one or more production centers.

19. The system of claim 14, wherein the one or more programming instructions that, when executed, cause the computing device to generate a new set of deployments comprise one or more programming instructions that, when executed, cause the computing device to:
identify a best deployment from the first set of deployments;
add the best deployment to the new set of deployments; and
replace, one or more logical devices in the first set of deployments with one or more logical devices based on one or more of the following:
an average distance between the logical device and one or more consumers, and
an average distance between the logical device and one or more production centers.

20. A system for scheduling a print job, the system comprising:
a computing device; and
a computer-readable storage medium in communication with the computing device, wherein the computer-readable storage medium comprises one or more programming instructions that, when executed, cause the computing device to:
determine a first set of deployments comprising one or more deployments,
wherein each deployment in the first set comprises an indication of a logical device in a cloud environment and an indication of a production center,
for one or more deployments in the first set of deployments, determine a total compliance value associated with the deployment,
identify a subset of deployments based on, at least in part, the associated total compliance values,
generate a new set of deployments based on, at least in part, the identified subset of deployments by:
identifying a best deployment from the first set of deployments,
adding the best deployment to the new set of deployments, and
replacing one or more logical devices in the first set of deployments with one or more logical devices based on one or more of the following:
an average distance between the logical device and one or more consumers, and
an average distance between the logical device and one or more production centers, and
in response to the new set of deployments being an improvement over the first set of deployments:
increment a count variable, and
repeat the determining a total compliance value, identifying, and generating operations until the count variable equals an exit condition value.

* * * * *